United States Patent [19]
Hegler

[11] Patent Number: 6,044,591
[45] Date of Patent: Apr. 4, 2000

[54] DRAIN AND INSPECTION MANHOLE FOR LIQUID CONDUITS AND MANHOLE SECTION THEREFOR

[76] Inventor: Ralph Peter Hegler, Schillerstrasse 7, D-97688 Bad Kissingen, Germany

[21] Appl. No.: 09/176,988

[22] Filed: Oct. 22, 1998

[30] Foreign Application Priority Data

Oct. 30, 1997 [DE] Germany .......................... 197 47 863

[51] Int. Cl.[7] .................................................. E02D 29/14
[52] U.S. Cl. .................................. 52/20; 405/36; 405/52; 285/197; 285/903; 285/382
[58] Field of Search .................................. 405/36, 40, 41, 405/43, 44, 45, 76, 77, 49, 52, 53, 55; 285/197, 133.21, 133.5, 903, 382; 52/20, 21

[56] References Cited

U.S. PATENT DOCUMENTS

| | | | |
|---|---|---|---|
| 3,390,224 | 6/1968 | Wyatt | 52/20 |
| 4,089,139 | 5/1978 | Moffa et al. | 52/20 |
| 4,286,808 | 9/1981 | Fouss et al. | |
| 4,570,976 | 2/1986 | Othold et al. | 285/197 |
| 5,608,998 | 3/1997 | Hume | 52/20 |
| 5,693,347 | 12/1997 | Hegler. | |
| B1 5,320,797 | 4/1997 | Hegler et al. | |

FOREIGN PATENT DOCUMENTS

| | | |
|---|---|---|
| 0358857 | 3/1990 | European Pat. Off. . |
| 0097392 | 1/1994 | European Pat. Off. . |
| 29616503 U | 12/1996 | Germany . |
| 2217744A | 11/1989 | United Kingdom . |

OTHER PUBLICATIONS

Copy of U.S. Application 08/797,457, Dec. 1998, now US Pat No. 5,796,635 to Hegler.
Search Report Jan. 1979 EPX.

*Primary Examiner*—Eileen Dunn Lillis
*Assistant Examiner*—Frederick L. Lagman
*Attorney, Agent, or Firm*—Robert F. I. Conte; Lee, Mann, Smith, McWilliams, Sweeney & Ohlson

[57] ABSTRACT

A drain and inspection manhole for liquid conduits, in particular waste water and/or storm water drains, comprises a manhole section which is formed as a composite pipe having a smooth cylindrical internal pipe and a corrugated external pipe. The external pipe is deformed to comprise at least one connecting base with a marginal web. Apertures that are flush with each other are cut into the connecting base and the internal pipe, a connector being inserted in these apertures.

15 Claims, 6 Drawing Sheets

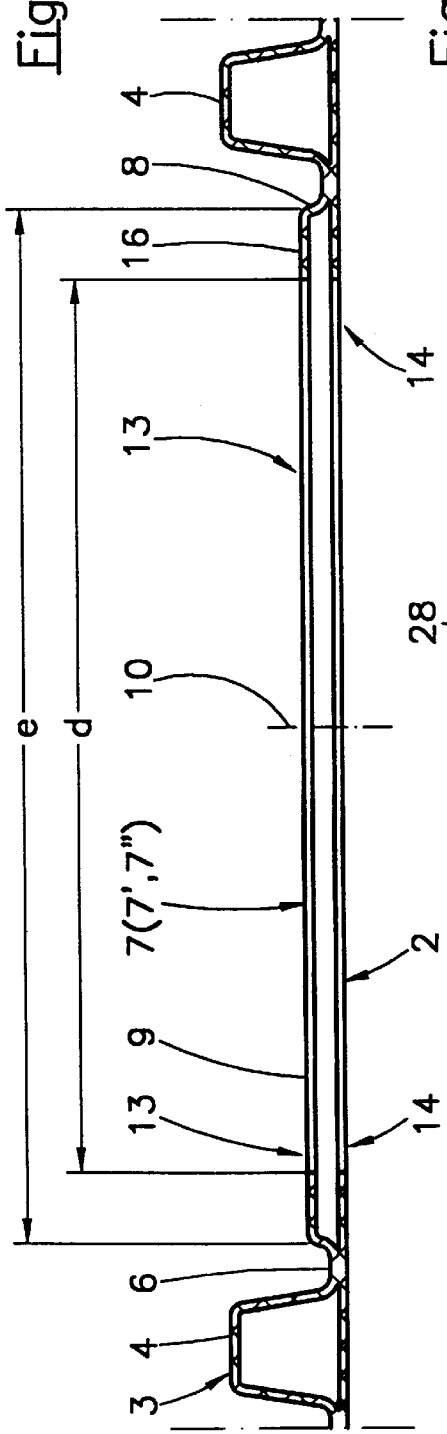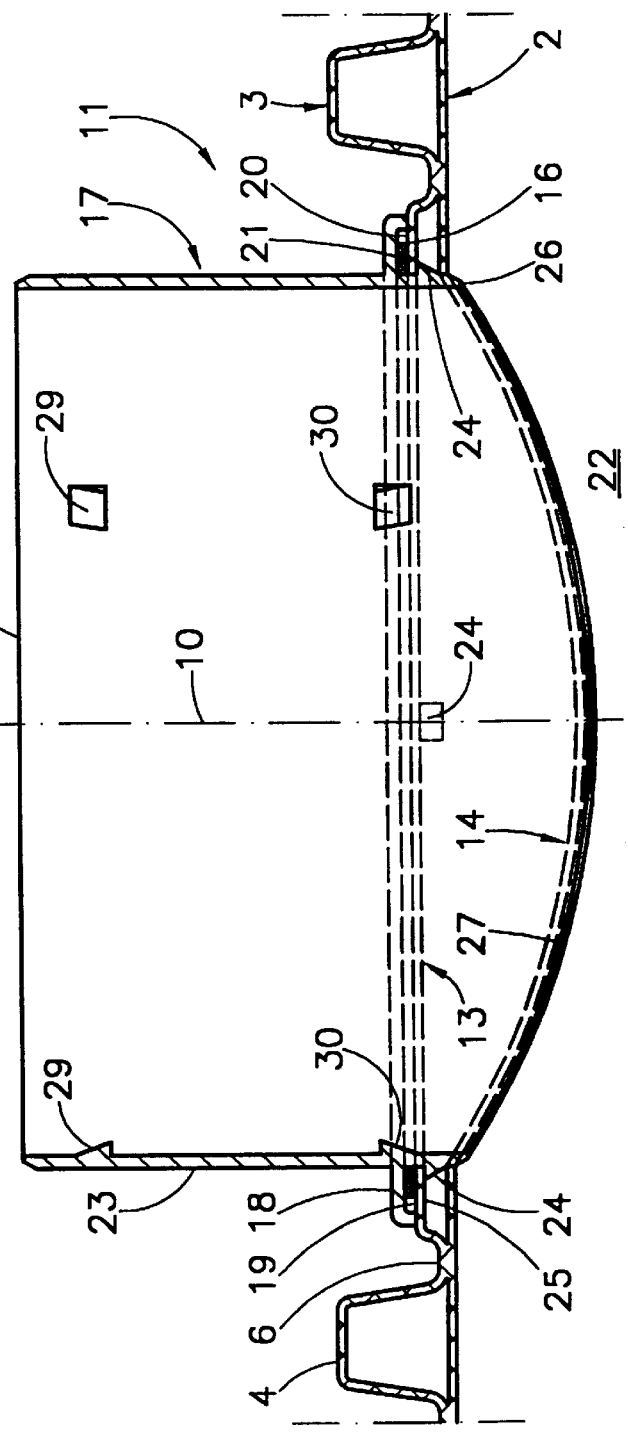

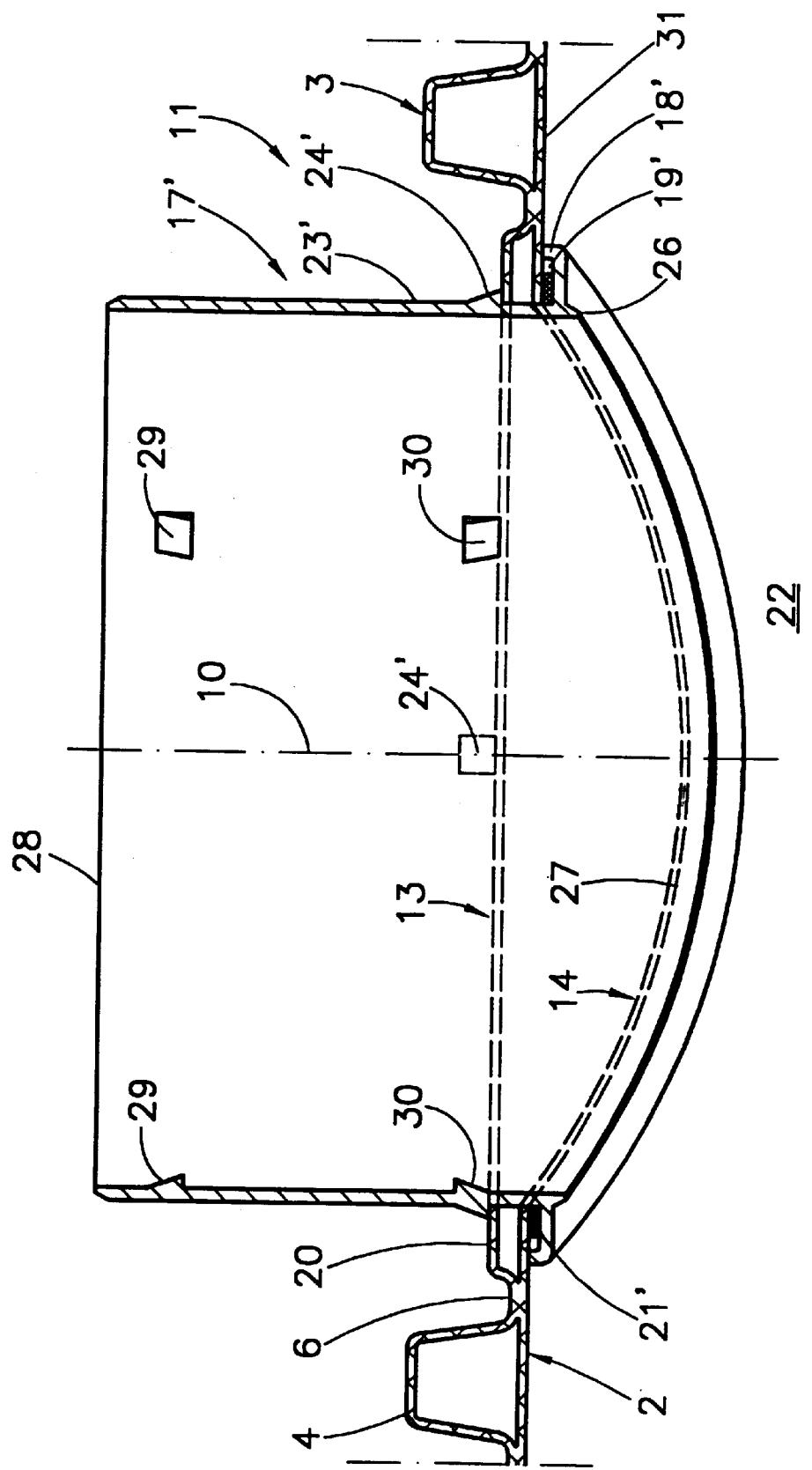

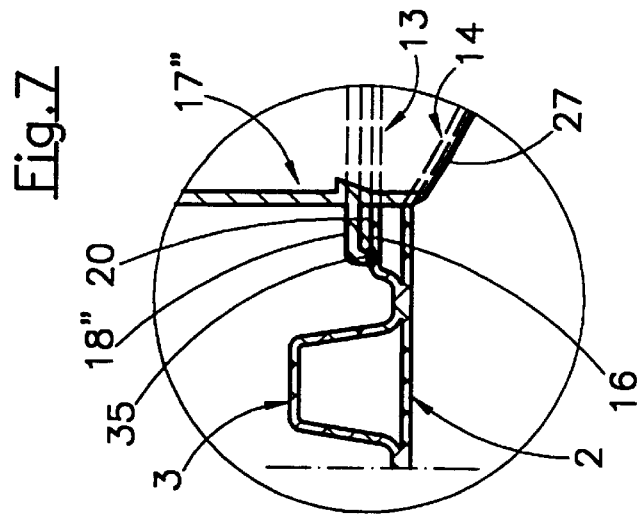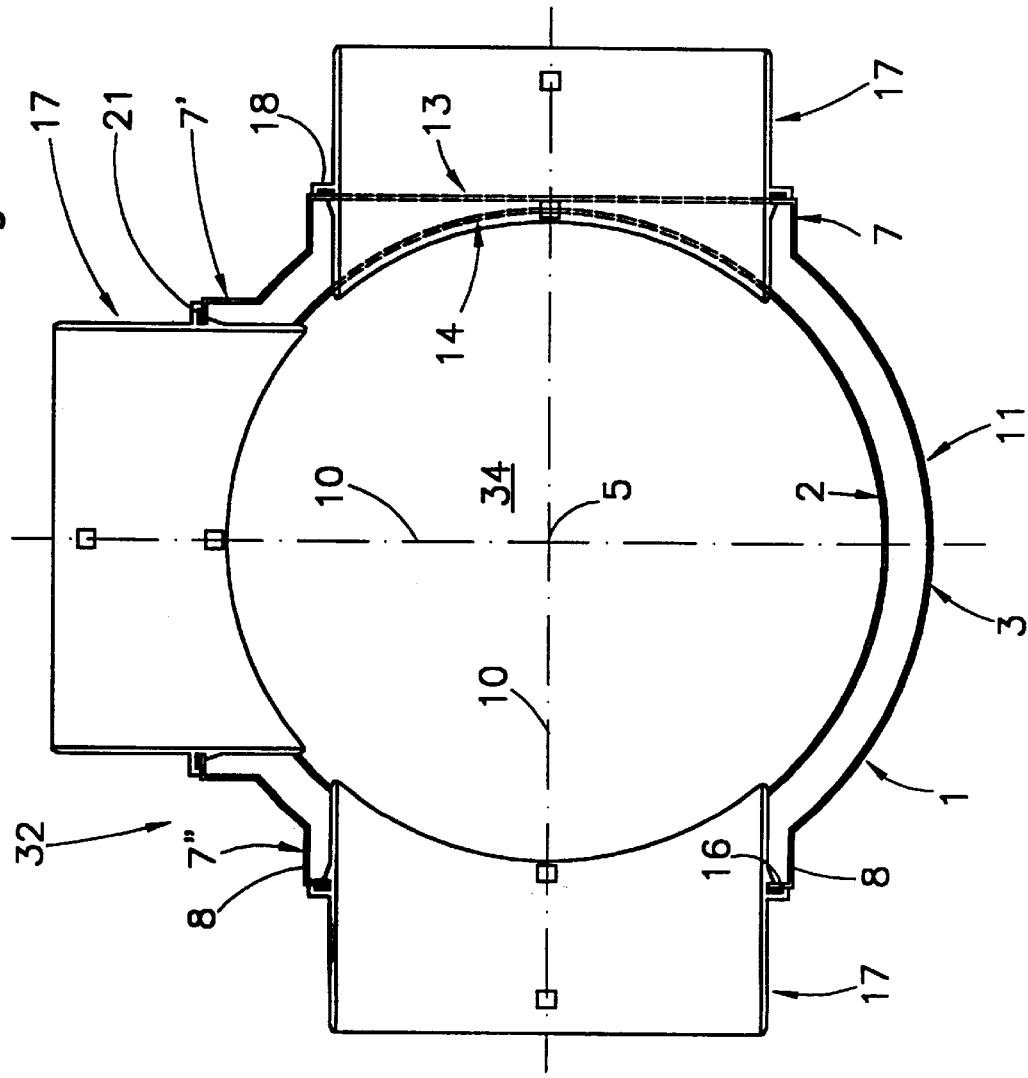

6,044,591

DRAIN AND INSPECTION MANHOLE FOR LIQUID CONDUITS AND MANHOLE SECTION THEREFOR

BACKGROUND OF THE INVENTION

1. Field of the Invention

The invention relates to a drain and inspection manhole for liquid conduits, in particular waste water and/or storm water drains, comprising a manhole section, which has a central longitudinal axis, which is formed as a composite pipe having a smooth cylindrical internal pipe and a corrugated external pipe, which has at least one aperture in the external pipe and an aperture, flush therewith, in the internal pipe, and which is equipped with a connector which is disposed in the aligning apertures and joined to the composite pipe and which has a central axis. The invention further relates to a manhole section for such a drain and inspection manhole.

2. Background Art

A drain and inspection manhole of the generic type is known from prior public use. The manhole section is produced from a commercial composite pipe which comprises a smooth cylindrical internal pipe and a corrugated external pipe. Apertures are cut into this composite pipe, into which a connector is inserted from within and joined to the composite pipe by gluing. This drain and inspection manhole can be produced easily and at a low cost, but it can be made only of PVC (poly vinyl chloride), because the connectors and the internal pipe must be glued together on the latter's inside.

The 1.07.96.50 HT leaflet entitled "opti-dran-System" of the company of Frarkische Rohrwerke Gebr. Kirchner GmbH+Co teaches a drain and inspection manhole, the manhole section of which consists of a simple corrugated pipe of PVC-U with connections injection-molded thereon at given distances. Apertures are cut into these connections, into which connectors are inserted from within, which are joined thereto by gluing or welding. A drawback of this known solution resides in that the drain and inspection manhole is rather difficult to clean because of the internal corrugation of the manhole section. The manhole is not very solid, because it is axially deformable.

EP 0 358 857 B1 teaches a drain and inspection manhole, the manhole section of which consists of a simple corrugated pipe which is closed at its root by a bottom of special design.

SUMMARY OF THE INVENTION

It is the object of the invention to embody a drain and inspection manhole of the generic type which is convenient to produce and extremely solid.

According to the invention, this object is attained by the external pipe being deformed to comprise at least one connecting base with a marginal web which is concentric of the central axis, which encircles the aperture in the external pipe and which accommodates the connector. Being formed as a composite pipe, the manhole section is extraordinarily stable and easy to clean due to the smooth-walled design of the internal pipe. By the external pipe being deformed to constitute a connecting base, simple and reliable mounting of the respective connector is possible.

Special emphasis must be laid on the possibility of locking engagement of the connector and the connecting base, in which both are tightly and fundamentally non-detachably united in a particularly simple way. This enables plastic materials to be used, the welding or gluing of which is rather difficult or not possible at all.

Further emphasis must be laid on the advantageous development according to which the connector is a composite pipe having a smooth internal pipe and an external pipe which is provided with corrugation rings and has an externally smooth cylindrical section which is inserted into the aligning apertures; and according to which, in vicinity to the cylindrical section, a corrugation ring is formed as a stop ring which supports itself on the marginal web; and according to which an annular web is formed as a stop ring on the cylindrical section, supporting itself on the marginal web. This ensures that no specific molding tools have to be manufactured for the connectors, this being of major economic importance in particular in the case of great diameters of the connectors. In this case the connectors can be produced during the manufacture of, i.e. jointly with, the pipes that are to be joined to the connectors. When these to-be-joined-on pipes are manufactured to have smooth-walled, i.e. non-corrugated, sections which serve either as a so-called spigot or are expanded to form sockets, then corresponding pipe sections only have to be cut out of the composite pipe and can be employed as connectors. Even if this is not the case, it is possible at intervals to produce a smooth cylindrical section instead of a corrugated pipe by some minor conversion of the corresponding apparatus, i.e. by the corresponding use of one or two molds.

Further features, advantages and details of the invention will become apparent from the ensuing description of exemplary embodiments of the invention, taken in conjunction with the drawing.

BRIEF DESCRIPTION OF THE DRAWING

FIG. 3 is a partial lengthwise section through the composite pipe of FIG. 1 on the section line III—III of FIG. 1;

FIG. 4 is a partial cross-section through a drain and inspection manhole with a connector inserted from the outside;

FIG. 5 is a partial cross-section through a drain and inspection manhole with a connector inserted from the inside;

FIG. 6 is a cross-section through a drain and inspection manhole with a connector inserted from the outside;

FIG. 7 is a partial cross-section through a connector in a modified design;

DESCRIPTION OF THE PREFERRED EMBODIMENTS

Figure 1:
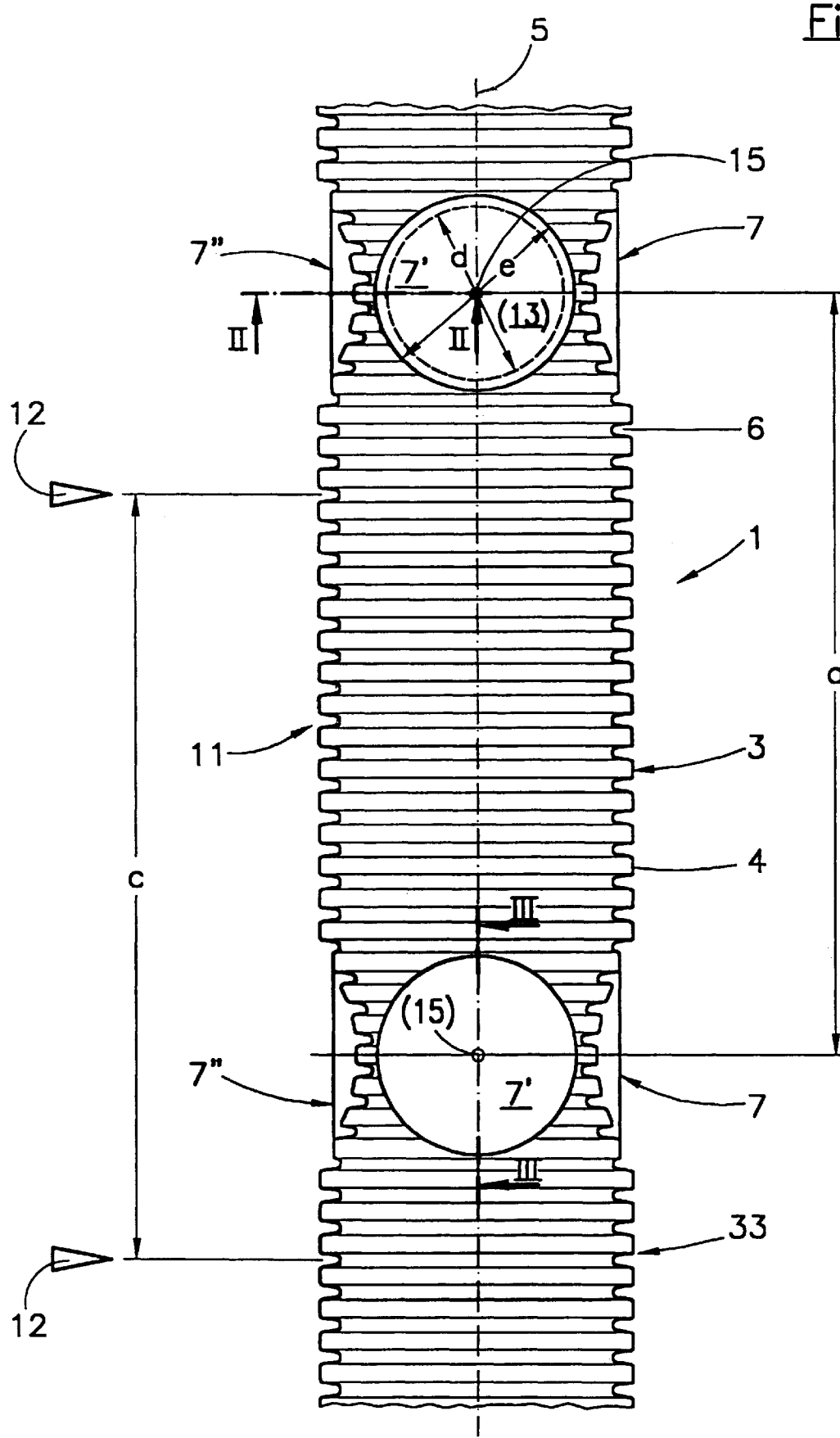
FIG. 1 is a plan view of a composite pipe, out of which manhole sections can be cut.
Figure 2:
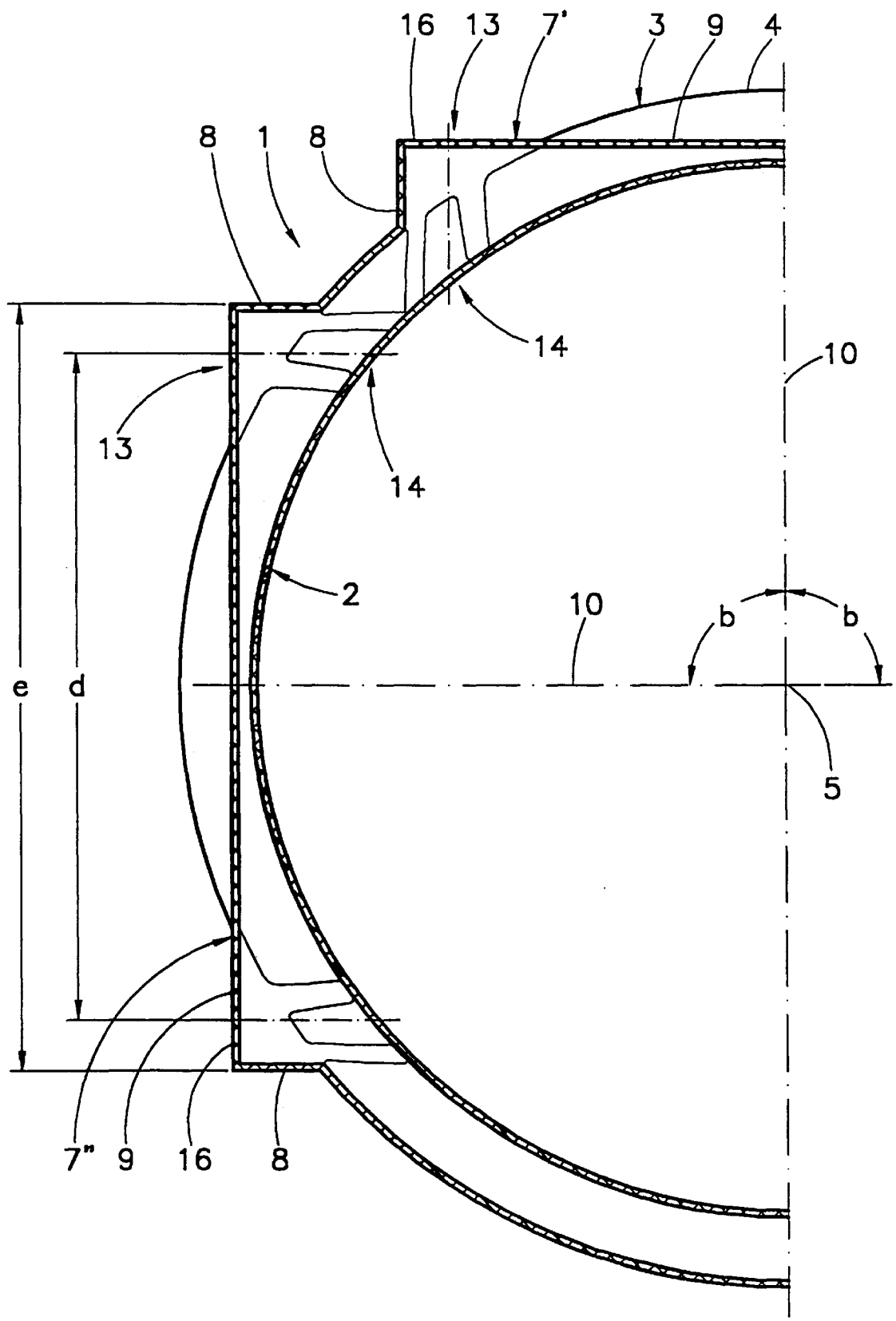
FIG. 2 is a partial cross-section through the composite pipe on the section line II—II of FIG. 1.

FIGS. 1 to 3 illustrate a continuously manufactured corrugated composite pipe 1 which comprises a smooth cylindrical internal pipe 2 and a corrugated external pipe 3. The corrugation 4 of the external pipe 3 has the cross-sectional shape of a trapezoid which tapers outwards from the central longitudinal axis 5. The external pipe and the internal pipe 2 are welded together in each case between, and at the root 6 of, two neighboring corrugations 4. In this regard, composite pipes 1 of this type are generally known and widely spread in practice.

Connecting bases 7, 7', 7" are formed on the composite pipe 1 at given regular distances a related to the central longitudinal axis 5. These connecting bases 7, 7', 7" are shaped in such a way that the external pipe 3 is not deformed to exhibit a corrugation 4, but to have a short annular cylindrical marginal web 8 and a plate 9 closing the web 8. The connecting base 7, 7', 7", i.e. its marginal web 8, has a central axis 10 which intersects the central longitudinal axis 5 of the composite pipe 1 at right angles. For certain applications, the connecting bases 7, 7', 7" may be disposed eccentrically, i.e. in such a case their central axis 10 does not intersect the central longitudinal axis 5 of the composite pipe 1. As can be seen in FIGS. 1 and 2, provision is made for three connecting bases 7, 7', 7" on a plane crosswise to the central longitudinal axis 5, the central axes 10 of which having an angle b of 90° relative to each other, as seen among others in FIG. 2. The composite pipe 1 comprising the connecting bases 7, 7', 7" can for instance be manufactured on an apparatus as known from U.S. Pat. No. 5,320,797 and U.S. Pat. No. 5,693,347, the molds of course having to correspond to the shape specified above.

By means of the cutting equipment roughly outlined in FIG. 1, manhole sections 11 are cut out of the fundamentally continuous composite pipe, the length c of the manhole sections 11 corresponding to the distance a of the connecting bases 7, 7', 7".

Subsequently, an aperture 13 that is concentric of the central axis 10 is cut into the connecting-base plate 9 in the direction of the respective central axis 10, and an aperture 14 of the same size as, and flush with, the opening 14 is cut into the portion, lying underneath, of the internal pipe 2. This can for instance be done by a crown drill. In order that this drill can be centered more easily relative to the central axis 10, a depression 15 which marks the central axis 10 can be formed in the respective connecting-base plate 9 according to the illustration of FIG. 3. The apertures 13 and 14 are roughly outlined in FIGS. 1 to 3. Their diameter d is are smaller than the diameter e of the connecting bases 7, 7', 7" so that in each case an outer annular flange 16 is left over from the connecting-base plate 9.

A connector 17 is inserted into the apertures 13, 14, substantially consisting of a cylindrical piece of pipe equipped with a stop ring 18 which projects radially to the central axis 10 and bears against the outside 20 of the annular flange 16 after the mounting of the connector 17 on the connecting base (7, 7', 7")—as seen in FIG. 4. In the embodiment according to FIG. 4, the stop ring 18 has a recess 19 in which is disposed a seal 21 bearing against the outside 20 of the annular flange 16 so that the interior 22 of the man hole section 11 is sealed externally. Such sealing is necessary in a mode of application used for waste water. In a mode of application used for storm water, no total sealing is necessary, there being no need to place the seal 21 in this case. In vicinity to the stop ring 18, barb-type locking projections 24 are formed on the outer surface 23 of the connector 17, reaching under the inside 25 of the annular flange 16 so that the connector 17, when mounted, is in tightly locking engagement with the respective annular flange 16.

The contour of the edge 26 of the connector 17 turned towards the interior 22 of the manhole section 11 corresponds to the contour of the aperture 14, as seen in FIG. 4. It projects slightly into the interior 22 and rests closely on the edge 27 that defines the aperture 14. The locking projections 24 are arranged at some distances from each other; for instance, in the embodiment according to FIG. 4, provision is made for four locking projections 24 at regular angles of 90°. In the embodiment according to FIG. 4, the assembly of the connector 17 takes place from the outside by the edge 26 of the connector 17 simply being inserted into the apertures 13 and 14.

In the vicinity of the outer edge 28 of the connector 17, locking projections 29 are formed, which project inwards and to which for instance joining pipes or reducers can be fixed detachably, which is disclosed for example by DE G 94 08 350.9 U1. Approximately in the vicinity of the locking projections 24, stops 30 are formed on the inner wall of the connector 17, having joining pipes or reducers support themselves thereon so that they have a defined position relative to the connector 17 and in particular do not project into the internal pipe 2 and the interior 22.

By alternative, according to the illustration of FIG. 5, mounting a connector 17' may also take place from the interior 22 of the manhole section 11. In his case a stop ring 18' is formed on the outer surface 23' of the connector 17', bearing against the inner surface 31 of the internal pipe 2. It has also a recess 19' in which a seal 21' is disposed which is placed to bear sealingly against the inner surface 31 of the internal pipe 2. Locking projections 24' are formed on the outer surface 23' of the connector 17', which bear against the outside 20 of the annular flange 16. In this case the connector 17' is clamped between the internal pipe 2 and the annular flange 16 formed from the external pipe 3. As for the rest, the above description holds good.

FIG. 6 illustrates a drain and inspection manhole 32 which comprises a manhole section 11 with three connectors 17 and in which the manhole section 11 is closed by a bottom 34 at its root 33 (cf. FIG. 1), i.e. in vicinity to the connecting bases 7, 7', 7".

FIG. 7 illustrates an embodiment in which the stop ring 18" does not possess a recess for a seal. Locking projections 24 are not provided either. Rather, the stop ring 18" surface 35, which is turned towards the outside 20 of the annular flange 16, and the outside 20 of the annular flange 16 are welded together, to which end the composite pipe 1 on the one hand and the connector 17" on the other must of course consist of a weldable plastic material. The welding job takes place by so-called butt-welding, i.e. the ring surface 35 of the stop ring 18" and the outside 20 of the annular flange 16 are pressed against a ring at welding temperature, whereby the plastic material, in this area, is sufficiently softened to become weldable. After the removal of the ring, the mentioned surfaces are pressed together, cooling down. In particular when polyolefins are used as a material for the composite pipe 1 and the connector 17", a liquid-proof connection can be produced in this way without any difficulties.

Figure 8:
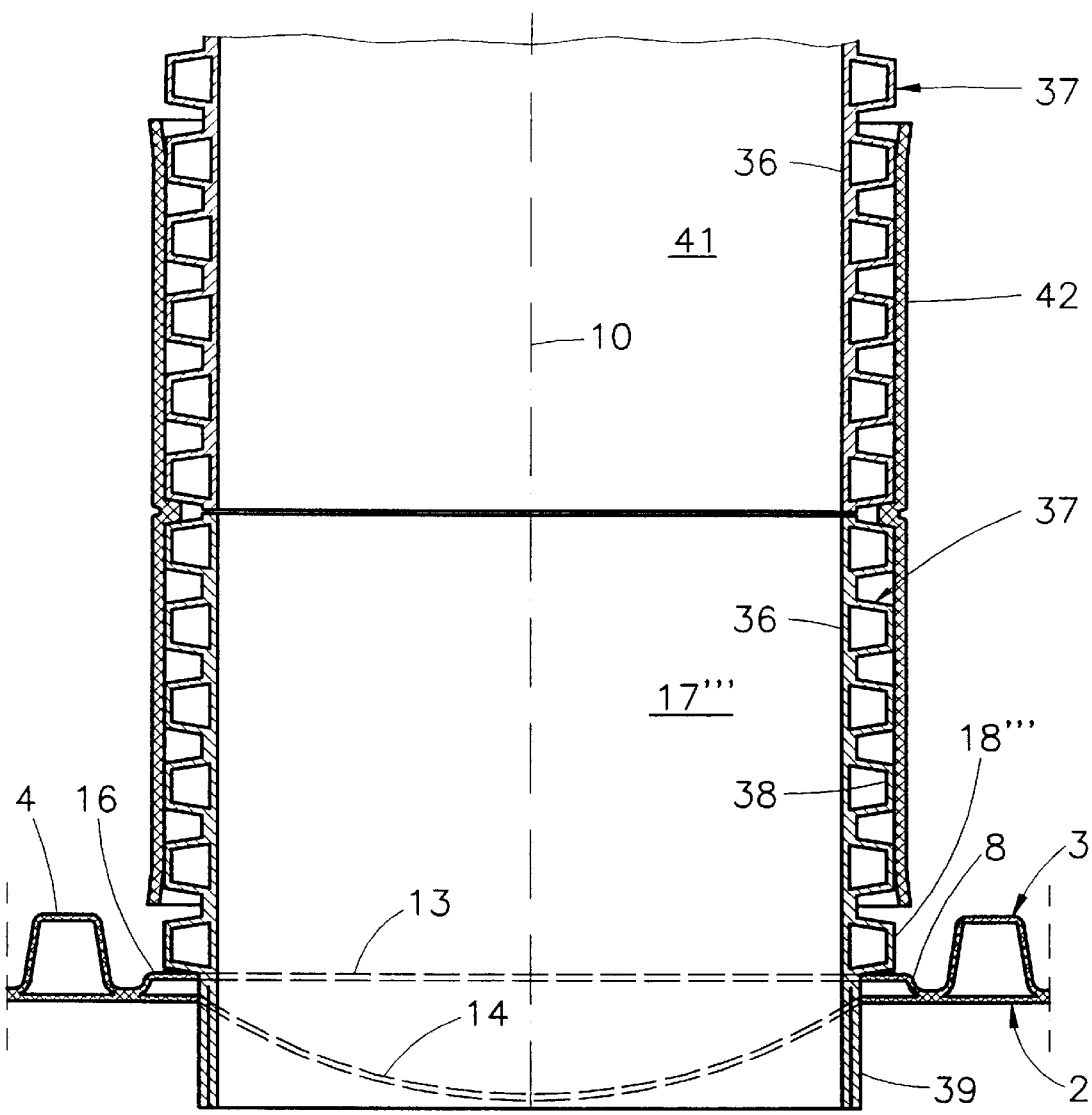
FIG. 8 is a partial cross-section through an embodiment in which the connector is formed by a composite pipe.

FIG. 8 illustrates a connector 17''' consisting substantially of a composite pipe that comprises a smooth internal pipe 36 and an external pipe 37, the external pipe being equipped with a conventional corrugation in the form of rings 38. At an end to be inserted into the connecting base 7, the connector 17''' is smooth externally, i.e. the external pipe 37 does not possess any corrugation in this portion. This smooth cylindrical section 39 is inserted into the apertures 13, 14 of the connecting base 7 or 7' or 7", respectively, sufficiently far for the ring 38, which directly adjoins the cylindrical section 39, bears against the annular flange 16 of the connecting base 7. In this case, too, support is taken on the marginal web 8 of the connecting base. A liquid-proof connection of the connecting base 7 with the connector 17''' can be put into practice in the same way as with the embodiment according to FIG. 7. Furthermore, this may also be done by gluing.

Figure 9:
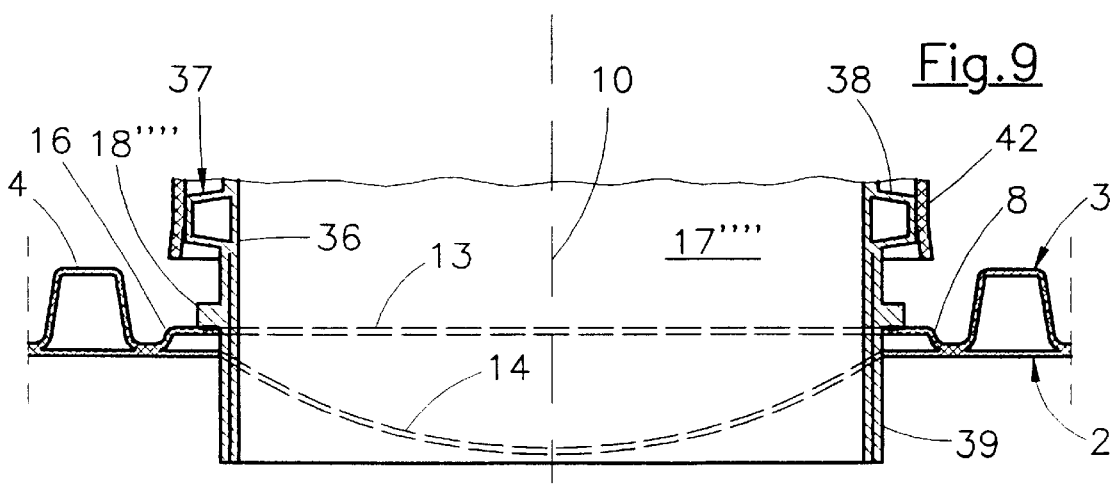
FIG. 9 is a partial cross-section through a connector in the form of a composite pipe with a modified stop ring as compared with FIG. 8.

The design of the connector 17''' in the embodiment according to FIG. 9 corresponds to that of FIG. 8, the difference residing in that a stop ring 18'''', which bears against the annular flange 16, is formed by an annular web 40 on the cylindrical section 39. In this case, too, a liquid-proof connection of the connector 17'''' with the connecting base 7 can be put into practice in the same way as with the embodiment according to FIG. 7 and 8.

Both connectors 17''' and 17''', inclusive of their cylindrical section 39 and possibly the annular web 40, are produced on an apparatus for the manufacture plastic composite pipes, the basic structure of which is known and illustrated and described for example in U.S. Pat. No. 5,320,797 or in U.S. patent application Ser. No. 08/797 457. The connectors 17''' and 17'''' are produced in the course of the manufacture of such composite pipes 41 that have the same internal pipe 36 and external pipe 37 with corrugation rings 38 and—as seen in FIG. 8—are to be joined to the corresponding connectors 17''' and 17''''. As can be seen in FIG. 8, this takes place in the customary way by means of a double insertion socket 42; of course, any other suitable type of socket joint is possible as well.

What is claimed is:

1. A drain and inspection manhole (32) for liquid conduits, comprising
    a manhole section (11),
        which has a central longitudinal axis (5),
        which is formed as a composite pipe (1) having a smooth cylindrical internal pipe (2) and a corrugated external pipe (3),
        which has at least one aperture (13) in the external pipe (3) and an aperture (14), flush therewith, in the internal pipe (2), and
        which is equipped with a connector (17, 17', 17'', 17''', 17'''') which is disposed in the aligning apertures (13, 14) and joined to the composite pipe (1) and which has a central axis (10),
    wherein the external pipe (3) is deformed to comprise at least one connecting base (7, 7', 7'') with a marginal web (8) which is concentric of the central axis (10), which encircles the aperture (13) in the external pipe (3) and which accommodates the connector (17, 17', 17'', 17''', 17'''').

2. A manhole according to claim 1,
wherein the connector (17, 17', 17'', 17''', 17'''') is fixed on the connecting base (7, 7', 7'') at least in one direction of the central axis (10).

3. A manhole according to claim 1,
wherein the connecting base (7, 7', 7'') comprises an annular flange (16) which is concentric of the central axis (10) and stands out from the marginal web (8) towards the central axis (10) and defines the aperture (13) in the external pipe (3).

4. A manhole according to claim 1,
wherein the connector (17, 17', 17'', 17''', 17'''') supports itself on the composite pipe (1) by means of a stop ring (18, 18', 18'', 18''', 18'''').

5. A manhole according to claim 4,
wherein the stop ring (18, 18'', 18''', 18'''') supports itself on the annular flange (16).

6. A manhole according to claim 4,
wherein the stop ring (18') supports itself on the internal pipe (2).

7. A manhole according to claim 4,
wherein the stop ring (18, 18') comprises a seal (21, 21').

8. A manhole according to claim 1,
wherein the connector (17, 17') is in locking engagement with the composite pipe (1).

9. A man hole according to claim 8,
wherein the connector (17, 17') is provided with locking projections (24, 24').

10. A manhole according to claim 1,
wherein the connector (17'', 17''', 17'''') is joined to the composite pipe (1) by welding.

11. A manhole according to claim 10,
wherein the connector (17'', 17''', 17''''), by means of a stop ring (18'', 18''', 18''''), supports itself on an annular flange (16) and is joined thereto by welding, the annular flange (16) standing out from the marginal web (8) towards the central axis (10) and defining the aperture (13) in the external pipe (3).

12. A manhole according to claim 1,
wherein the connector (17''', 17'''') is a composite pipe having a smooth internal pipe (36) and an external pipe (37) which is provided with corrugation rings (38) and has an externally smooth cylindrical section (39) which is inserted into the aligning apertures (13, 14).

13. A manhole according to claim 12,
wherein in vicinity to the cylindrical section (39), a corrugation ring (38) is formed as a stop ring (18''') which supports itself on the marginal web (8).

14. A manhole according to claim 12,
wherein an annular web (40) is formed as a stop ring (18'''') on the cylindrical section (39), supporting itself on the marginal web (8).

15. A manhole section for a drain and inspection manhole (32) for liquid conduits, comprising
    a manhole section (11),
        which has a central longitudinal axis (5),
        which is formed as a composite pipe (1) having a smooth cylindrical internal pipe (2) and a corrugated external pipe (3),
        which has at least one aperture (13) in the external pipe (3) and an aperture (14), flush therewith, in the internal pipe (2), and
        which is equipped with a connector (17, 17', 17'', 17''', 17'''') which is disposed in the aligning apertures (13, 14) and joined to the composite pipe (1) and which has a central axis (10),
    wherein the external pipe (3) is deformed to comprise at least one connecting base (7, 7', 7'') with a marginal web (8) which is concentric of the central axis (10), which encircles the aperture (13) in the external pipe (3) and which accommodates the connector (17, 17', 17'', 17''', 17''''), and wherein the connecting base (7, 7', 7'') comprises a plate (9) which is formed in a single piece with the marginal web (8) and into which the opening (13) in the external pipe (3) is cut.

* * * * *